US008816854B2

(12) United States Patent
Bergman et al.

(10) Patent No.: US 8,816,854 B2
(45) Date of Patent: Aug. 26, 2014

(54) SYSTEM AND METHOD FOR REDUCING CART ALARMS AND INCREASING SENSITIVITY IN AN EAS SYSTEM WITH METAL SHIELDING DETECTION

(75) Inventors: Adam S. Bergman, Boca Raton, FL (US); John A. Allen, Pompano Beach, FL (US); Robert Kevin Lynch, Greenacres, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 992 days.

(21) Appl. No.: 12/615,755

(22) Filed: Nov. 10, 2009

(65) Prior Publication Data

US 2011/0109455 A1 May 12, 2011

(51) Int. Cl.

| | |
|---|---|
| ***G08B 13/14*** | (2006.01) |
| *G08B 21/00* | (2006.01) |
| *G05B 19/00* | (2006.01) |
| *H04B 1/00* | (2006.01) |
| *G06K 15/00* | (2006.01) |
| *H01J 40/14* | (2006.01) |

(52) U.S. Cl.
USPC ... 340/568.5; 340/686.1; 340/5.7; 340/568.1; 455/63.1; 235/383; 250/222.1

(58) Field of Classification Search
USPC .......... 340/568.5, 686.1, 5.7, 568.1; 455/63.1
See application file for complete search history.

(56) References Cited

U.S. PATENT DOCUMENTS 4,327,819 A 5/1982 Coutta
4,338,594 A * 7/1982 Holm .......................... 340/568.5
5,485,006 A 1/1996 Allen et al.
5,495,102 A * 2/1996 Fine .......................... 250/222.1
6,201,473 B1 3/2001 Schaffer
6,542,079 B1 4/2003 Kahl, Sr.
6,741,177 B2 * 5/2004 Ballantyne ................. 340/568.5
7,453,358 B2 11/2008 Webster
8,264,353 B2 * 9/2012 Dinh et al. ................. 340/568.1

(Continued)

FOREIGN PATENT DOCUMENTS

DE 3217944 A1 11/1983
EP 1173836 B1 4/2010

(Continued)

OTHER PUBLICATIONS

International Search Report and Written Opinion dated Feb. 8, 2011 for International Application Number: PCT/US2010/002681, International Filing Date: Oct. 5, 2010 consisting of 13-pages.

*Primary Examiner* — Jack K Wang
(74) *Attorney, Agent, or Firm* — Alan M. Weisberg; Christopher & Weisberg, P.A.

(57) ABSTRACT

A system for detecting electronic article surveillance ("EAS") marker shielding includes an EAS subsystem a metal detector, a cart detection subsystem and a processor. The EAS subsystem is operable to detect an EAS marker in an interrogation zone. The metal detector is operable to detect a metal object in the interrogation zone. The cart detection subsystem includes a sensor array. The cart detection subsystem is operable to differentiate between a wheeled device and a human passing through the interrogation zone based on the sensor array. The processor is electrically coupled to the EAS subsystem, the metal detector and the cart detection subsystem. The processor is programmed to receive information outputted from the cart detection system and information outputted from the metal detector to determine whether to generate an alarm signal based on the presence of EAS marker shielding.

20 Claims, 7 Drawing Sheets

(56) References Cited

U.S. PATENT DOCUMENTS

| | | | | |
|---|---|---|---|---|
| 2003/0184440 | A1* | 10/2003 | Ballantyne | 340/568.5 |
| 2006/0032914 | A1 | 2/2006 | Brewster et al. | |
| 2009/0322492 | A1* | 12/2009 | Hannah et al. | 340/10.5 |
| 2010/0001872 | A1* | 1/2010 | Lian et al. | 340/661 |
| 2010/0039264 | A1* | 2/2010 | Bergman | 340/572.1 |
| 2010/0176947 | A1* | 7/2010 | Hall | 340/572.1 |
| 2011/0074581 | A1* | 3/2011 | Falkenberg et al. | 340/568.1 |
| 2011/0109456 | A1* | 5/2011 | Bergman et al. | 340/568.5 |
| 2011/0171910 | A1* | 7/2011 | Dinh et al. | 455/63.1 |
| 2011/0215928 | A1* | 9/2011 | Soto et al. | 340/572.1 |
| 2011/0260865 | A1* | 10/2011 | Bergman et al. | 340/568.1 |
| 2011/0273301 | A1* | 11/2011 | Dinh et al. | 340/600 |
| 2012/0092166 | A1* | 4/2012 | Allen et al. | 340/572.1 |
| 2012/0112918 | A1* | 5/2012 | Dinh et al. | 340/600 |
| 2012/0299729 | A1* | 11/2012 | Soerensen et al. | 340/568.1 |

FOREIGN PATENT DOCUMENTS

| | | | |
|---|---|---|---|
| WO | 2008028487 | A1 | 3/2008 |
| WO | 2008125621 | A1 | 10/2008 |
| WO | 2010083020 | A1 | 7/2010 |

* cited by examiner

SYSTEM AND METHOD FOR REDUCING CART ALARMS AND INCREASING SENSITIVITY IN AN EAS SYSTEM WITH METAL SHIELDING DETECTION

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to electronic article surveillance ("EAS") systems and more specifically to a method and EAS system that detects metals and magnetic materials and reduces false alarms caused by the presence of a metallic cart in the EAS interrogation zone.

BACKGROUND OF THE INVENTION

Electronic article surveillance ("EAS") systems are commonly used in retail stores and other settings to prevent the unauthorized removal of goods from a protected area. Typically, a detection system is configured at an exit from the protected area, which comprises one or more transmitters and antennas ("pedestals") capable of generating an electromagnetic field across the exit, known as the "interrogation zone". Articles to be protected are tagged with an EAS marker that, when active, generates an electromagnetic response signal when passed through this interrogation zone. An antenna and receiver in the same or another "pedestal" detects this response signal and generates an alarm.

Because of the nature of this process, other magnetic materials or metal, such as metal shopping carts, in proximity to the EAS marker or the transmitter may interfere with the optimal performance of the EAS system. Further, some unscrupulous individuals utilize EAS marker shielding, e.g., metal foil, with the intent of shoplifting merchandise without detection from any EAS system. The metal can shield tagged merchandise from the EAS detection system.

Current EAS systems implementing metal shielding detection mechanisms may sometimes be fooled by various cart configurations and overpowered by the response of a large mass of metal. Some systems attempt to overcome this problem by lowering the gain of the system, which limits the sensitivity and reduces the detection capability for small items, such as the metal shielding they are trying to detect.

Other conventional systems may include a "shopping cart inhibit" feature in the EAS system/metal detection configuration. By monitoring the overall mass of the metal response signal, a threshold can be implemented indicating an inhibit situation so that the system will not falsely generate an alarm. However, even with this solution implemented, some store merchandise will continue to fool the system and result in a false alarm or missed detection. For example, detection of large metal shielding positioned close to the pedestals is reduced because these shields produce readings which exceed the thresholds.

Therefore, what is needed is a system and method for independently detecting the presence of a cart or stroller within an EAS interrogation zone, thereby allowing increased sensitivity of an EAS system with metal shield detection capabilities.

SUMMARY OF THE INVENTION

The present invention advantageously provides a method and system for detecting electronic article surveillance ("EAS") marker shielding by independently detecting the presence of a cart or other wheeled device with the EAS interrogation zone. Generally, the present invention is able to differentiate between a wheeled device and a human walking between the pedestals by examining a breakage pattern from a sensor array located on the pedestals just above the floor.

In accordance with one aspect of the present invention, a system for detecting EAS marker shielding includes an EAS subsystem, a metal detector, a cart detection subsystem and a processor. The EAS subsystem is operable to detect an EAS marker in an interrogation zone. The metal detector is operable to detect a metal object in the interrogation zone. The cart detection subsystem includes a sensor array. The cart detection subsystem is operable to differentiate between a wheeled device and a human passing through the interrogation zone based on the sensor array. The processor is electrically coupled to the EAS subsystem, the metal detector and the cart detection system. The processor is programmed to receive information outputted from the cart detection system and information outputted from the metal detector to determine whether to generate an alarm signal based on a presence of EAS marker shielding.

In accordance with another aspect of the present invention, a method is provided for detecting EAS marker shielding. A metallic object is detected within an interrogation zone. A wheeled device is differentiated from a human passing through the interrogation zone. Responsive to determining that a wheeled device is not passing through the interrogation zone, an alert signal is generated which notifies the presence of EAS marker shielding.

In accordance with yet another aspect of the present invention, an electronic EAS system controller for use with a metal detector includes an EAS subsystem, a communication interface, a cart detection subsystem and a processor. The EAS subsystem is operable to detect an EAS marker in an interrogation zone. The communication interface is operable to receive inputs from the metal detector. The cart detection subsystem includes a sensor array. The cart detection subsystem is operable to differentiate between a wheeled device and a human passing through the interrogation zone based on the sensor array. The processor is electrically coupled to the EAS subsystem, the communication interface and the cart detection subsystem. The processor is programmed to receive information outputted from the cart detection system and information outputted from the metal detector to determine whether to generate an alarm signal based on a presence of EAS marker shielding.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
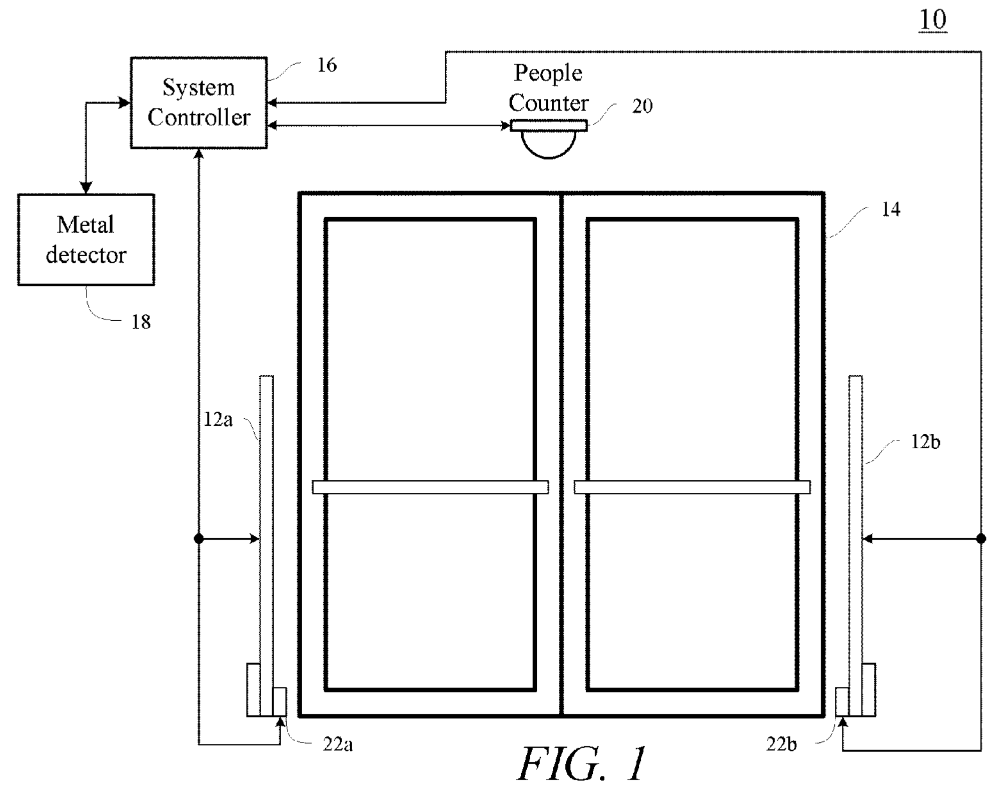
FIG. 1 is a block diagram of an exemplary electronic article surveillance ("EAS") detection system having metal detection, cart detection and people counting capabilities constructed in accordance with the principles of the present invention.

Before describing in detail exemplary embodiments that are in accordance with the present invention, it is noted that the embodiments reside primarily in combinations of apparatus components and processing steps related to implementing a system and method for independently detecting the presence of a cart or stroller within an EAS interrogation zone, thereby allowing increased sensitivity of an EAS system having EAS marker shielding detection capabilities. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as “first” and “second,” “top” and “bottom,” and the like, may be used solely to distinguish one entity or element from another entity or element without necessarily requiring or implying any physical or logical relationship or order between such entities or elements.

One embodiment of the present invention advantageously provides a method and system for detecting a cart or stroller in an interrogation zone of an EAS system and improving the sensitivity of the EAS system to detect an EAS marker shield. The EAS system combines traditional EAS detection capabilities with a set of infrared sensor arrays located near the floor on the base of the EAS pedestals to detect the movement of a wheel passing through the interrogation zone.

Referring now to the drawing figures in which like reference designators refer to like elements, there is shown in FIG. 1 one configuration of an exemplary EAS detection system 10 constructed in accordance with the principles of the present invention and located, for example, at a facility entrance. EAS detection system 10 includes a pair of pedestals 12*a*, 12*b* (collectively referenced as pedestal 12) on opposite sides of an entrance 14. One or more antennas for the EAS detection system 10 may be included in pedestals 12*a* and 12*b*, which are located a known distance apart. The antennas located in the pedestals 12 are electrically coupled to a control system 16 which controls the operation of the EAS detection system 10. The system controller 16 is electrically connected to a metal detector 18, a people counting system 20 and an infrared sensor array 22 for more accurately detecting the presence of a foil-lined bag. The infrared sensor array 22 consists of a pair of infrared sensor panels 22*a*, 22*b* (referenced collectively as “infrared sensor array 22”). It is also contemplated that other types of sensor arrays can be used, such as a pressure sensitive mat arranged to provide data indicating where pressure has been applied, and the like.

The metal detector 18 may be a separate unit, communicatively connected to the system controller 16, or may be integrated into the system controller 16. One exemplary metal detector 18 is disclosed in U.S. patent application Ser. No. 12/492,309, filed Jun. 26, 2009 and entitled “Electronic Article Surveillance System with Metal Detection Capability and Method Therefore,” the entire teachings of which are hereby incorporated by reference.

The people counting system 20 may be a separate device, such as an overhead people counter, or may be physically located in one or more pedestals 12 and/or integrated into the system controller 16. The people counting system may include, for example, one or more infrared sensors mounted approximately 8 to 14 feet (2.5 m to 4.3 m) above the retailer’s entrance/exit. Integrating people counting sensors into the EAS detection pedestal 12 helps to ensure a simple and effective method of delivering essential operational information. In operation, the people counter detects the movement of a person into, through, or out of the predetermined area. That information is collected and processed by the people counting system 20, e.g., using a programmed microprocessor. People counting data may then be transmitted using conventional networking means to other portions of the EAS detection system 10, and/or through the store’s internal network or across wide area networks such as the Internet, where it can be sorted, reported and studied.

Figure 2:
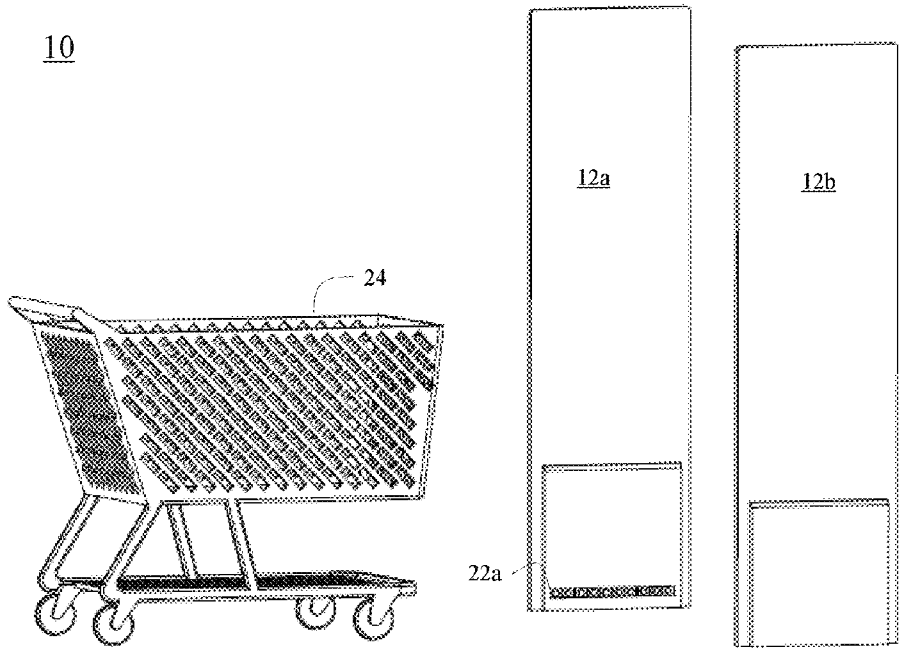
FIG. 2 is a side perspective view of a cart transiting the exemplary EAS system of FIG. 1 constructed in accordance with the principles of the present invention.
Figure 3:
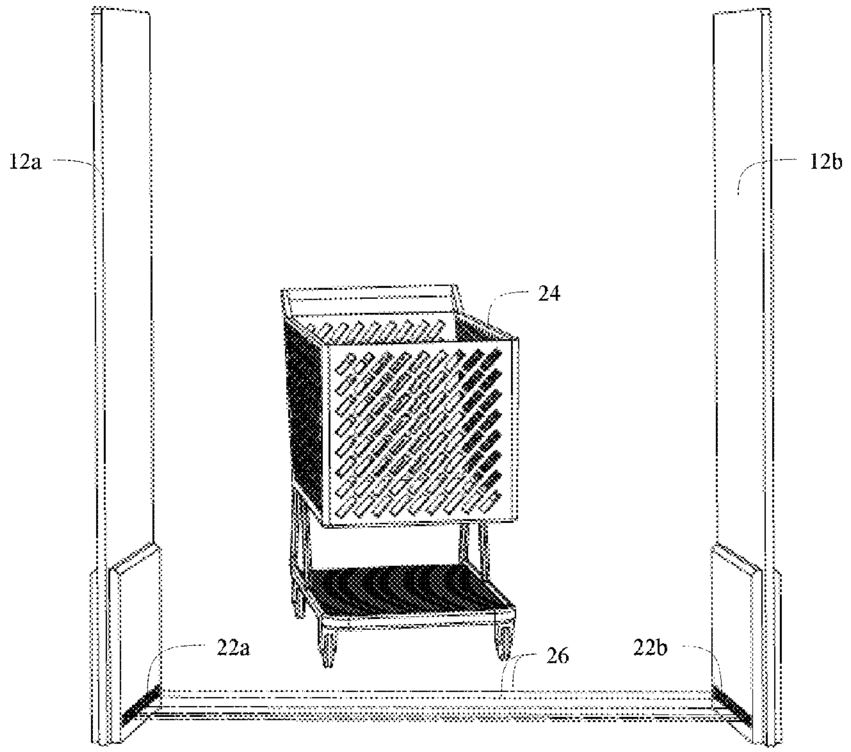
FIG. 3 is a front perspective view of a cart transiting the exemplary EAS system of FIG. 1 constructed in accordance with the principles of the present invention.

Referring now to FIGS. 2 and 3, perspective views of a cart 24 transiting the exemplary EAS system 10 are provided. As can be seen from FIG. 2, the infrared sensor arrays 22 are located at the base of the pedestals 12 at a height of about ¼ inch (6.4 mm) to 2 inches (51 mm) from the floor. The length of the infrared sensor array 22 should be at least 6-12 inches (152 mm-305 mm) long to allow for differentiation between a cart wheel and a human foot. The infrared sensor array 22 is arranged such that the sensors produce multiple parallel beams 26 between the pedestals 12, as shown in FIG. 3. Because of the proximity of the beams to the floor, the beams 26 are broken by the wheels of a cart 24, stroller or other wheeled-object passing between the pedestals 12. The beams 26 are also broken when a person walks between the pedestals; however, the pattern of breakage for a person walking through the beams 26 is different than that of a cart 24 rolling through the beams 26. For example, since the wheels of a cart 24 never leave the floor, the cart 24 will break the beams 26 sequentially and will always pass through each beam 26, but a person walking may break several beams 26 simultaneously and does not necessarily break each beam 26 in the array 22. By recognizing the differences in these patterns, an embodiment of the present invention is able to distinguish a cart 24 or stroller from other metallic objects and use this information to increase the sensitivity and accuracy of its metal foil-lined bag detection. The operation of the infrared sensor array 22 in combination with the system controller 16 is discussed in greater detail below.

Figure 4:
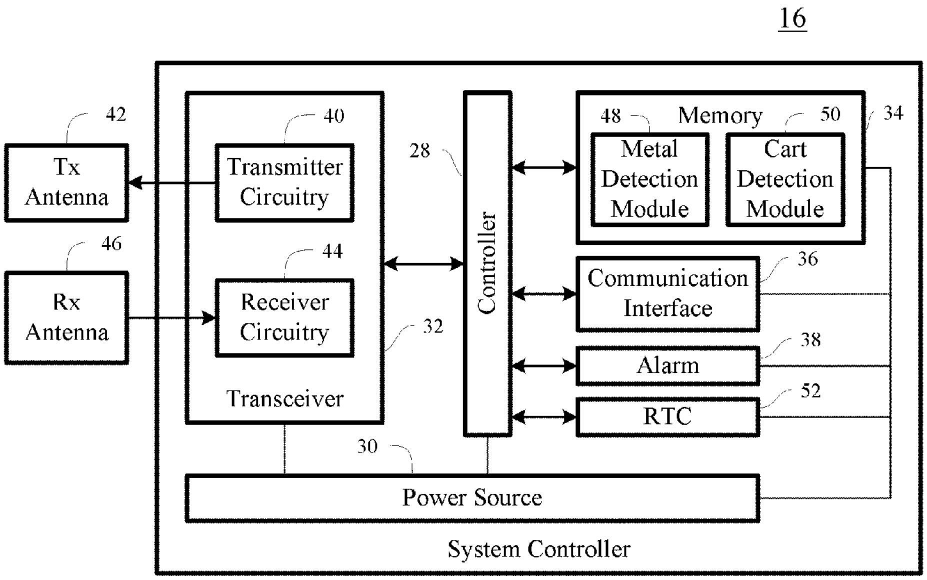
FIG. 4 is a block diagram of an exemplary EAS system controller constructed in accordance with the principles of the present invention.

Referring now to FIG. 4, an exemplary EAS system controller 16 may include a controller 28 (e.g., a processor or microprocessor), a power source 30, a transceiver 32, a memory 34 (which may include non-volatile memory, volatile memory, or a combination thereof), a communication interface 36 and an alarm 38. The controller 28 controls radio communications, storage of data to memory 34, communication of stored data to other devices, and activation of the alarm 38. The power source 30, such as a battery or AC power, supplies electricity to the EAS control system 16. The alarm 38 may include software and hardware for providing a visual and/or audible alert in response to detecting an EAS marker and/or metal within an interrogation zone of the EAS system 10.

The transceiver 32 may include a transmitter 40 electrically coupled to one or more transmitting antennas 42 and a receiver 44 electrically coupled to one or more receiving antennas 46. Alternately, a single antenna or pair of antennas may be used as both the transmitting antenna 42 and the receiving antenna 46. The transmitter 40 transmits a radio frequency signal using the transmit antenna 42 to "energize" an EAS marker within the interrogation zone of the EAS system 10. The receiver 44 detects the response signal of the EAS marker using the receive antenna 46. It is also contemplated that an exemplary system 10 could include a transmitting antenna 42 and receiver 44 in one pedestal, e.g., pedestal 12*a* and a reflective material in the other pedestal, e.g., pedestal 12*b*.

The memory 34 may include a metal detection module 48 for detecting the presence of metal within the interrogation zone and a cart detection module 50 for determining if the detected metal is a cart, stroller or other wheeled object, e.g., a wheel-chair, hand-truck, etc. Operation of the metal detection module 48 and the cart detection module 50 is described in greater detail below. The metal detection module 48, in conjunction with the cart detection module 50, may determine whether to trigger the alarm 38 by analyzing output information received from the metal detector 18, the people counting system 20 and the infrared sensor arrays 22 via the communication interface 36. For example, if the cart detection module 50 has detected the passage of a person through the interrogation zone and the metal detector 18 has just detected a source of metal that fits the characteristics of a metal shield, the metal detection module 48 may trigger the alarm 38 by sending an alarm signal via the controller 28. The alarm 38 alerts store security or other authorized personnel who may monitor or approach the individual as warranted.

The controller 28 may also be electrically coupled to a real-time clock ("RTC") 52 which monitors the passage of time. The RTC 52 may act as a timer to determine whether actuation of events, such as metal detection or person counting, occurs within a predetermined time frame. The RTC 52 may also be used to generate a time stamp such that the time of an alarm or event detection may be logged.

Figure 5:
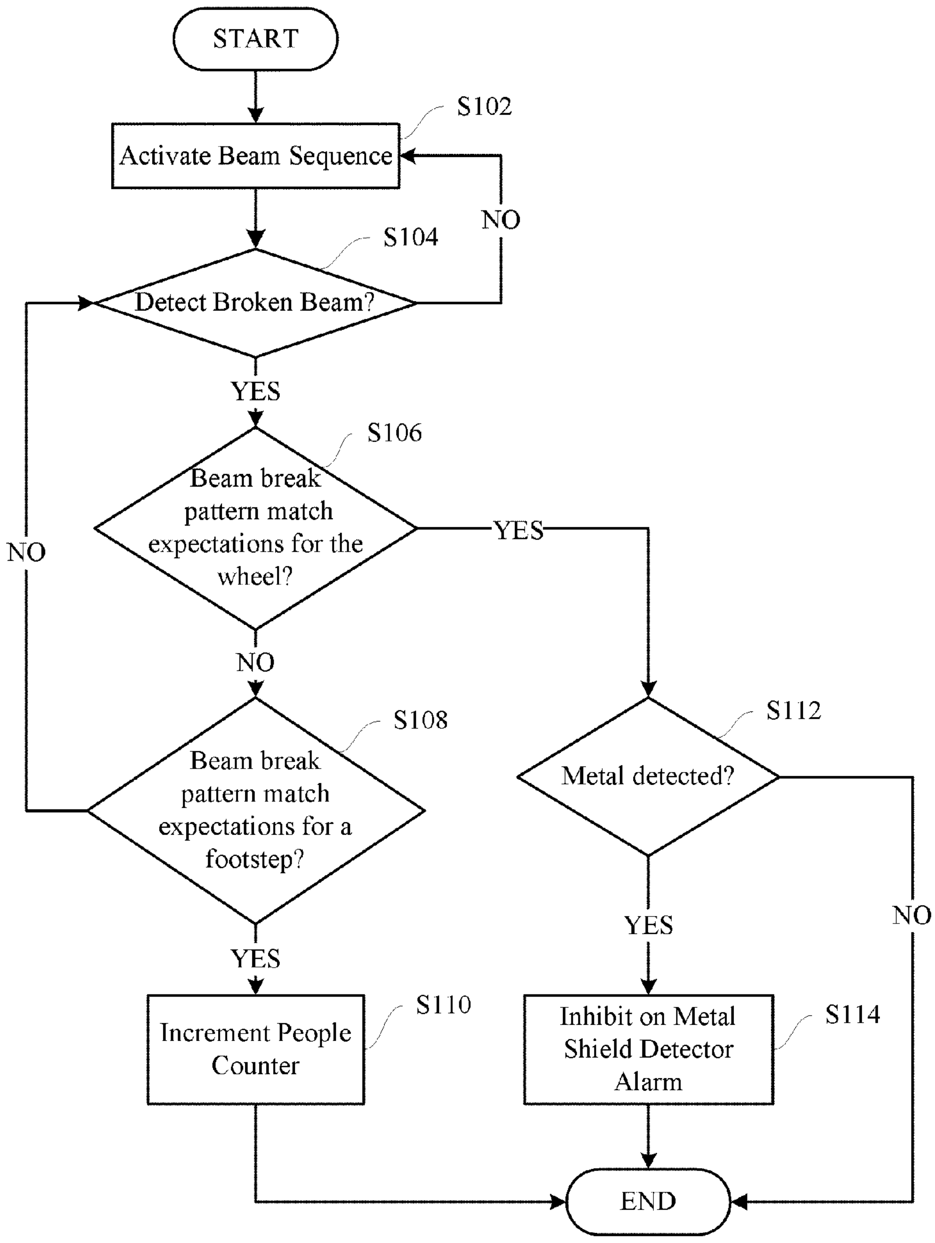
FIG. 5 is a flowchart of an exemplary cart detection process according to the principles of the present invention.

Referring now to FIG. 5, a flowchart is provided that describes exemplary steps performed by the EAS system 10 to determine whether an object passing through the pedestals 12 is a cart 24 or other wheeled-device. The system controller 16 enables the infrared sensor arrays 22 by activating a beam sequence which is dependent upon the configuration of the infrared sensor array 22 (step S102).

Figure 6:
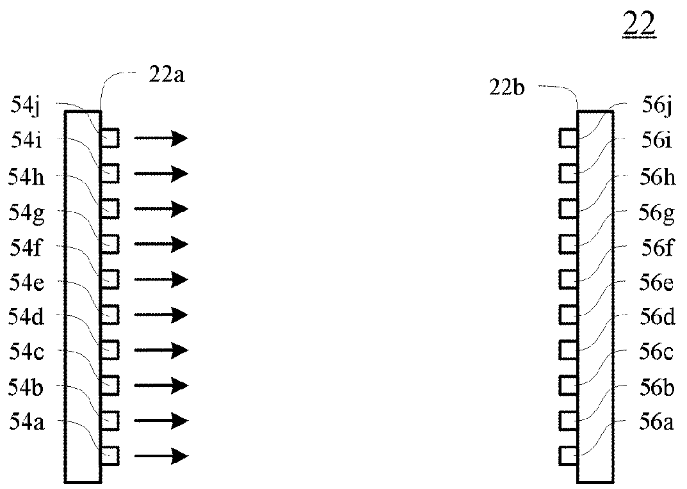
FIG. 6 is a block diagram of an exemplary configuration of infrared detection sensors constructed in accordance with the principles of the present invention.

The infrared sensor array 22 may be configured in a variety of manners. For example, as shown in FIG. 6, the infrared sensor array 22 may have one sensor panel 22*a* that includes only transmit components 54*a*-54*j* (referenced collectively as "transmit component 54") and the second sensor panel 22*b* includes only receive components 56*a*-56*j* (referenced collectively as "receive component 56"). It should be noted that, although FIG. 6 shows 10 pairs of infrared sensors, the number of sensor pairs shown is for illustrative purposes only and any number of sensor pairs that reliably produce a recognizable breakage pattern may be selected for implementation. For example, the present invention has been found to perform satisfactorily using five pairs of sensors. Also, although any sensor spacing can be used as long as the spacing allows determination of wheeled cart vs. human as described herein, one embodiment of the present invention implements the sensors approximately 2.75 to 3.00 inches (69.9 mm to 76.0 mm) apart.

While sensors having focused elements are preferred, the present invention can be implemented using non-focused elements. Also, while automatic gain control ("AGC") circuitry can be used as part of the sensor circuit, the present invention can be implemented using a sensor circuit that does not include an AGC circuit. It has been found that the latter embodiment allows operation at a faster cycle time as compared with the former embodiment, thereby providing improved accuracy. In the configuration shown in FIG. 6, all the transmit components 54 and receive components are active simultaneously, therefore, to initiate the beam sequence of step S102, the system controller 16 merely activates the entire infrared sensor array 22.

Figure 7:
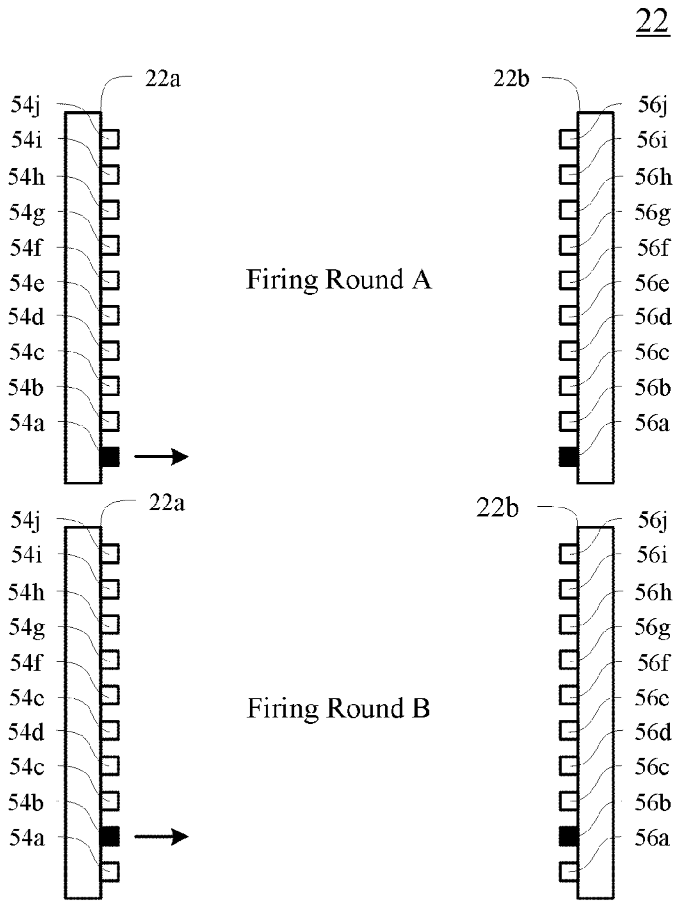
FIG. 7 is a flow diagram illustrating an exemplary firing sequence of the infrared detection sensor configuration of FIG. 6 according to the principles of the present invention.

FIG. 7 illustrates an alternative configuration of the infrared sensor array 22. Similar to the arrangement shown in FIG. 6, all the transmit components 54 are located on the same sensor panel 22*a* and the receive components 56 are located on the opposite sensor panel 22*b*. However, in this configuration, the controller 28 sequences the beams at a rapid pace wherein only a single pair of sensors are active at any one time. One embodiment of the present invention uses a sequencing rate of 200 Hz. For example, in FIG. 7, transmit sensor 54*a* transmits during the first firing round (Firing round A) and only receive sensor 56*a* is active to receive. During the second firing round (Firing round B), transmit sensor 54*b* transmits and only receive sensor 56*b* is active to receive. Each pair of infrared sensors are activated in turn until all the sensors have fired and the sequence begins again with the first pair of sensors. In this manner, the receive sensors 56 are guaranteed to only receive signals initiated from the corresponding transmit sensor 54 of the sensor pair, thereby eliminating false triggers from adjacent beams and improving overall sensitivity. Additionally, this sequencing mechanism allows for the use of less expensive infrared sensors (as compared with the sensors in FIG. 6) as each beam is not required to have a very narrow, focused beam—a feature which increases the piece-part cost of infrared sensor pairs. The use of a less focused beam allows for easier alignment of the transmit sensor 54 and the receive sensor 56.

Figure 8:
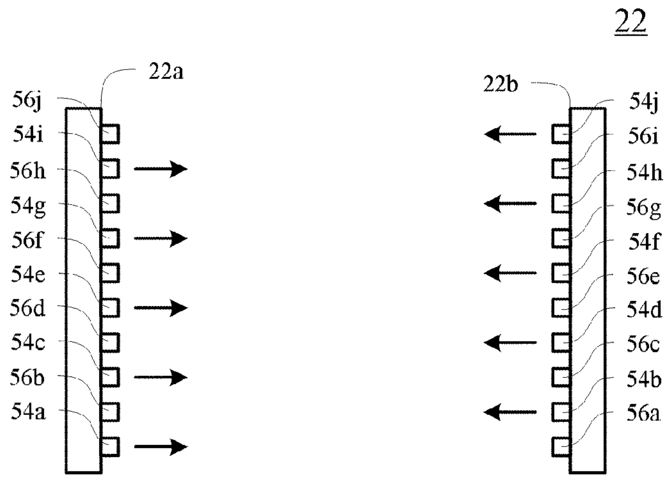
FIG. 8 is a block diagram of an alternative configuration of infrared detection sensors constructed in accordance with the principles of the present invention.

FIG. 8 illustrates an alternative configuration of the infrared sensor array 22. In this configuration, the transmit components 54 and the receive components 56 are alternated between infrared sensor panel 22*a* and infrared sensor panel 22*b* in order to improve discretion between adjacent infrared beams 26.

Figure 9:
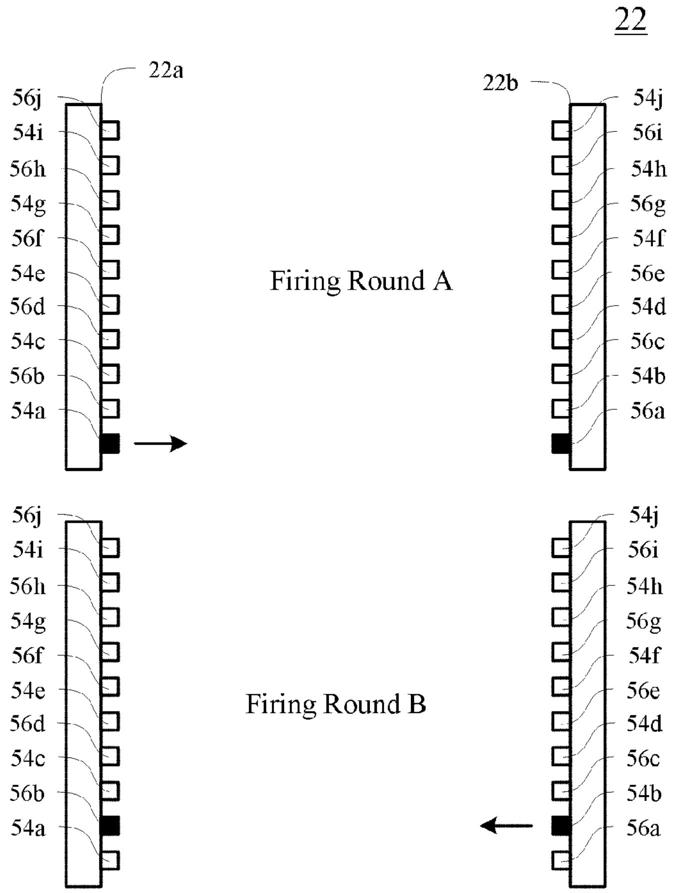
FIG. 9 is a flow diagram illustrating an exemplary firing sequence of the infrared detection sensor configuration of FIG. 8 according to the principles of the present invention.

FIG. 9 illustrates another alternative configuration of the infrared sensor array 22, in which the physical configuration of FIG. 8, i.e. transmitting components 54 alternated with receiving components 56, is combined with the firing sequence shown in FIG. 7 to provide an even greater discretion between adjacent beams 26 and further minimize false triggers.

Returning now to FIG. 5, the beam sequence runs in a continuous cycle as long as no beams are broken (step S102). When the system controller 16 detects that a beam has been broken (step S104), the cart detection module 50 monitors the infrared sensor array 22 to determine whether the present beam breakage pattern matches the expected pattern for a wheel (step S106). For example, an expected pattern for a wheel may be that each beam is broken sequentially for a given number of beams, up to and including all beams, and only a given number of beams is broken at any time. If the pattern does not match the expected pattern for a wheel, the cart detection module 50 compares the breakage pattern to the expected pattern for a human walking (step S108). An expected pattern for a person walking may be that up to a predetermined number of beams are simultaneously broken and/or not all the beams of the array are triggered. If the pattern matches a person walking, then the people counter 20 is incremented (step S110) and the process ends. If the pattern does not match the expected pattern for a person walking (step S108), the cart detection module 50 returns to decision block S104 to detect if any other beams have been broken, thereby changing the current breakage pattern.

Returning to decision block S106, if the current breakage pattern matches the expected pattern for a wheel, the system controller 16 determines whether the metal detection module 48 has detected the presence of metal within the interrogation zone (step S112). The metal detection module 48 may simply indicate the presence of metal within the interrogation zone or may return a response reading proportional to the amount of metal detected, in which case, the system controller 16 determines whether the response reading is greater than a predetermined threshold indicative of a response generated by a large metal object, such as a cart. If metal is not detected, the process ends. However, if there is metal present (step S112), the system controller 16 prevents the metal detection module 48 from generating an alarm indicating the presence of a metal shield (step S114). Similarly, if the metal detection module 48 detects metal in the interrogation zone and the cart detection module 50 determines that no cart is present, the system controller 16 may instruct the metal detection module 48 to generate an alarm indicating the presence of a metal shield. The process illustrated in FIG. 5 may be repeated continuously or at a predetermined interval.

Figure 10:
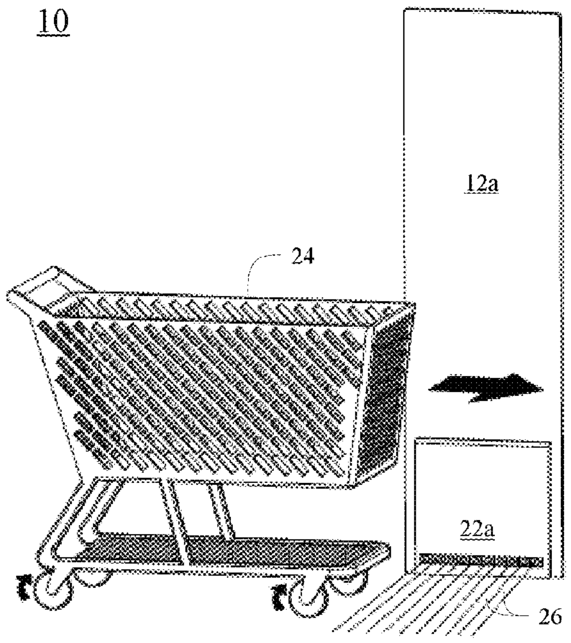
FIG. 10 is a side perspective view of a cart unobscuredly passing through sensor beams of the exemplary EAS system of FIG. 1 in accordance with the principles of the present invention.
Figure 11:
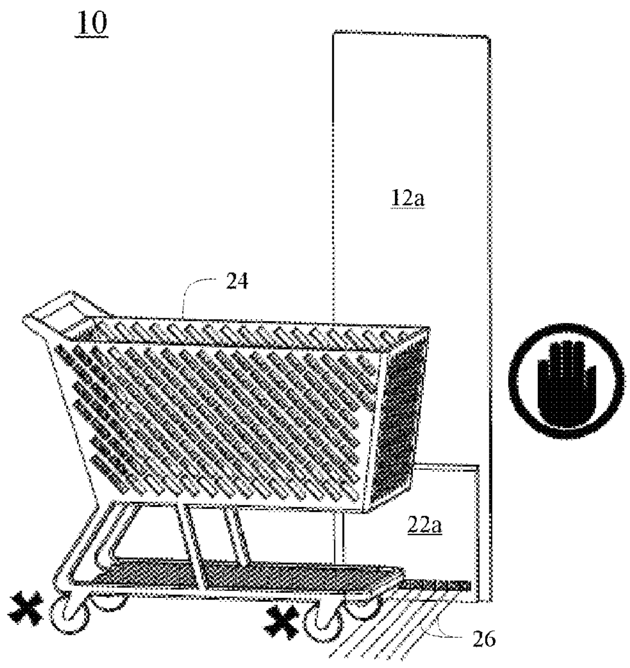
FIG. 11 is a side perspective view of a cart obscuring at least one sensor beam of the exemplary EAS system of FIG. 1 in accordance with the principles of the present invention.

Referring now to FIG. 10, the method of FIG. 5 is capable of accurately detecting a cart 24 or other wheeled-device as long as the cart is actually moving through the interrogation zone and breaking the infrared beams 26. However, when the cart 24 stops midway through the pedestals 12, as shown in FIG. 11, or when other items remain stationary between the pedestals 12, one or more sensor pairs become blocked, subsequently not functioning properly.

Figure 12:
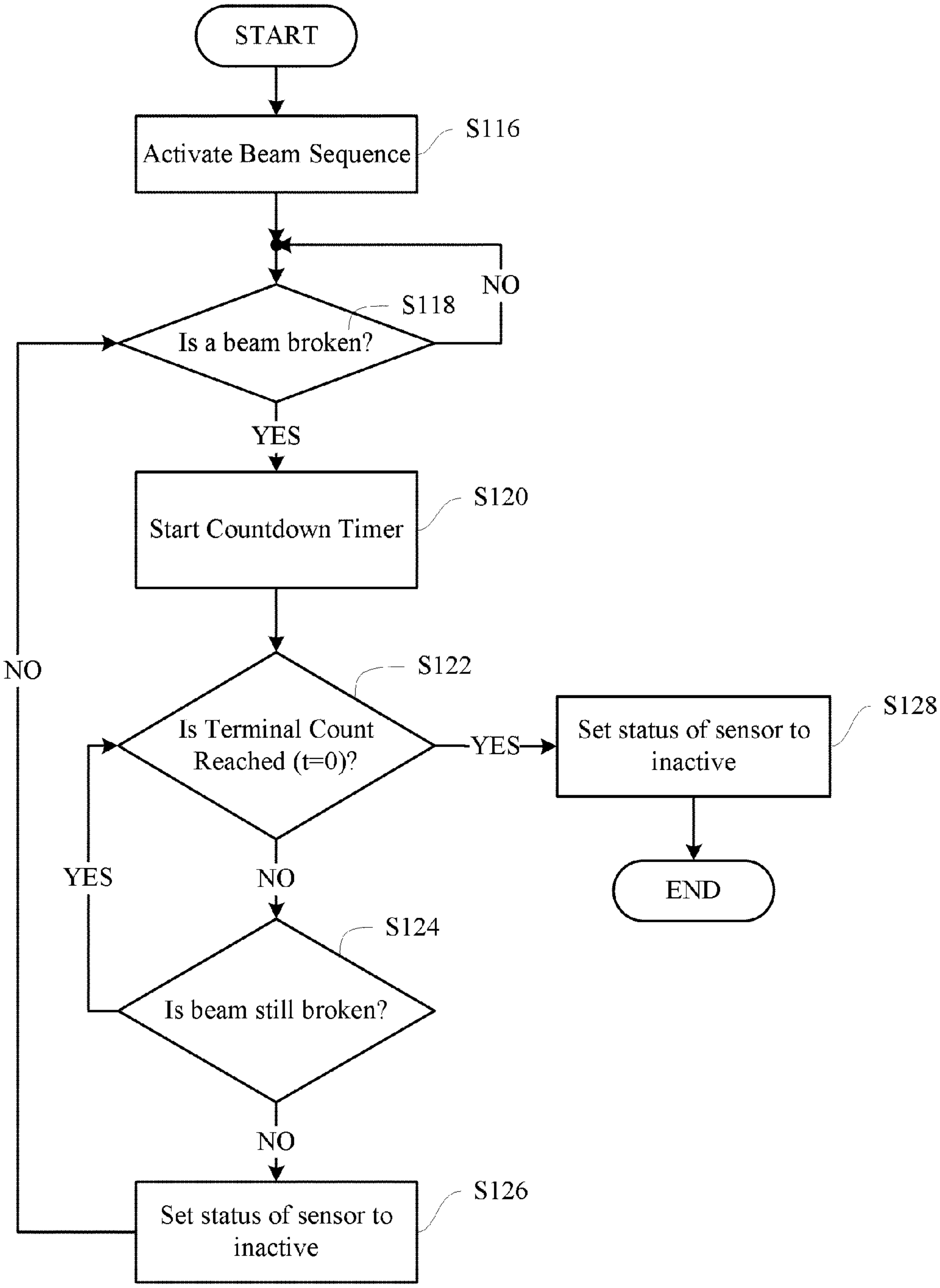
FIG. 12 is a flowchart of an exemplary blocked sensor detection process according to the principles of the present invention.

Referring now to FIG. 12, a flowchart is provided that describes exemplary steps performed by the EAS system 10 to detect one or more blocked sensor pairs. The system controller 16 enables the infrared sensor arrays 22 by activating a beam sequence as above in the cart detection process detailed in FIG. 5 (step S116). If a single beam is broken (step S118), then the real-time clock 52 begins a countdown timer (step S120).

The countdown timer may be set for a predetermined amount of time, e.g., 30 seconds, 1 minute, etc. The countdown timer is started as soon as a beam is broken. As long as the countdown timer has not reached a terminal count (step S122), i.e. t=0, then the cart detection module 50 continues to monitor the blocked sensor to determine if the sensor becomes unblocked (step S124). If the sensor becomes unblocked, then the system controller 16 sets the status of the sensor to active (step S126) and returns to decision block S118 to continue monitoring for blocked sensors. However, if the countdown timer reaches the terminal count without the blocked sensor becoming unblocked (step S124), the cart detection module 50 sets the status of the blocked sensor to inactive and does not use the blocked sensor in the cart detection process (step S128). The blocked sensor may be returned to active status if the previously blocked sensor has become unblocked by repeating the blocked sensor process. It is noted the starting value of the countdown timer can be set sufficiently large as to not create fall blockage triggers.

In the case where the blocked sensor process determines that multiple beams are blocked, such as might occur if a cart is left in the interrogation zone, a person lingers in the interrogation zone too long or even where some other object is blocking multiple sensors, it is contemplated that the system can alert the store manager or some other designated personnel.

The present invention can be realized in hardware, software, or a combination of hardware and software. Any kind of computing system, or other apparatus adapted for carrying out the methods described herein, is suited to perform the functions described herein.

A typical combination of hardware and software could be a specialized computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A system for detecting electronic article surveillance ("EAS") marker shielding, the system comprising:

an EAS subsystem configured to detect an EAS marker in an interrogation zone;

a metal detector configured to detect a metal object in the interrogation zone;

a cart detection subsystem including a sensor array configured to form a plurality of breakable beams, the cart detection subsystem configured to:

detect a wheeled device passing through the interrogation zone by matching a pattern of broken beams to an expected pattern for a wheeled device; and detect a human passing through the integration zone by matching a pattern of broken beams to an expected pattern for a human walking; and a processor electrically coupled to the EAS subsystem, the metal detector and the cart detection system, the processor configured to:

generate an alarm signal if the metal object and the human are detected, the alarm indicating a presence of EAS marker shielding.

2. The system of claim 1, wherein the interrogation zone is located between a pair of EAS pedestals, each EAS pedestal having a base end positioned to rest on a floor, the sensor array comprising:

a plurality of infrared sensor pairs, each infrared sensor pair including one transmitting component and one receiving component, the transmitting component located on one EAS pedestal of the pair of EAS pedestals, the receiving component located on the other EAS pedestal of the pair of EAS pedestals, such that when activated, each infrared sensor pair forms one of the plurality of breakable beams between the pedestals, each breakable beam is an infrared beam.

3. The system of claim 2, wherein each infrared beam is positioned sufficiently above the pedestal base end such that the infrared beam is broken by a wheel of the wheeled device rolling between the pedestals.

4. The system of claim 2, wherein each infrared beam is positioned substantially parallel to the floor and substantially parallel to all other infrared beams.

5. The system of claim 4, wherein each infrared beam is positioned at a height of substantially ¼ inch (6.4 mm) to substantially 2 inches (51 mm) above the base ends of the pedestals.

6. The system of claim 2, wherein the plurality of infrared sensor pairs are activated simultaneously.

7. The system of claim 2, wherein the each infrared sensor pair of the plurality of infrared sensor pairs are activated separately for a predetermined duration and in sequential order.

8. The system of claim 2, wherein the processor is further configured determined whether other beams have been broken if the determination is made that the pattern of broken beams does not match an expected pattern for a wheeled device and an expected pattern for a human walking.

9. The system of claim 1, wherein the expected pattern for a wheeled device includes each infrared sensor pair triggering sequentially.

10. The system of claim 1, wherein the expected pattern for a human walking includes simultaneously triggering more than one infrared sensor pair.

11. The system of claim 1, wherein the processor generates the alarm signal responsive to:

the metal detector detecting the metal object in the interrogation zone; and the cart detection subsystem determining that a wheeled device is not passing through the interrogation zone.

12. The system of claim 1, wherein the processor is further configured to determine that at least one infrared sensor pair is blocked, the cart detection subsystem is further configured to deactivate the at least one blocked infrared sensor pair based at least in part on the determination that the at least one infrared sensor pair is blocked.

13. A method for detecting electronic article surveillance ("EAS") marker shielding, the method comprising:

forming a plurality of breakable beams within an interrogation zone;

detecting a metallic object within the interrogation zone;

determining a wheeled device is passing through the interrogation zone if a pattern of broken beams matches an expected pattern for a wheeled device;

determining a human is passing through the interrogation zone if a pattern of broken beams match an expected pattern for a human walking; and generating an alert signal based at least in part on the detection of the metal object and determination a human is passing through the interrogation zone, the alert signal notifying a presence of EAS marker shielding.

14. The method of claim 13, wherein the interrogation zone is formed between a pair of EAS pedestals, each EAS pedestal having a base end positionable on a floor, wherein a sensor array forms the plurality of breakable beams, the sensor array including:

a plurality of infrared sensor pairs, each infrared sensor pair including one transmitting component and one receiving component, the transmitting component located on one EAS pedestal of the pair of EAS pedestals, the receiving component located on the other EAS pedestal of the pair of EAS pedestals, such that when activated, each infrared sensor pair forms one of the plurality of breakable beams between the pedestals, each breakable beam is an infrared beam.

15. The method of claim 14, wherein each infrared beam is positioned sufficiently above the pedestal base end such that each infrared beam is broken by a wheel of the wheeled device rolling between the pedestals.

16. The method of claim 14, further comprising determining whether other beams have been broken if the determination is made the pattern of broken beams does not match the expected pattern for a wheeled device and the expected pattern for a human walking.

17. The method of claim 14, further comprising:

determining that at least one infrared sensor pair is blocked; and deactivating the at least one blocked infrared sensor pair based at least in part on the determination that at least one infrared sensor pair is blocked.

18. An electronic article surveillance ("EAS") system controller for use with a metal detector configured to detect a metal object in the interrogation zone, the EAS system controller comprising:

an EAS subsystem configured to detect an EAS marker in an interrogation zone;

a communication interface configured to receive inputs from the metal detector, the metal detector configured to detect a metallic object within the interrogation zone;

a cart detection subsystem including a sensor array configured to form a plurality of breakable beams, the cart detection subsystem configured to determine:

a wheeled device is passing through the interrogation zone by matching a pattern of broken beams to an expected pattern for a wheeled device; and a human is passing through the integration zone by matching a pattern of broken beams to an expected pattern for a human walking; and a processor electrically coupled to the EAS subsystem, the communication interface and the cart detection subsystem, the processor configured to:

generate an alarm signal if a human is determined to be passing through the interrogation zone and a metallic object is detected within the interrogation zone, the alarm signal indicating a presence of EAS marker shielding; and inhibit the alarm signal if a wheeled device is determined to be passing through the interrogation zone and a metallic object is detected within the interrogation zone.

19. The EAS system controller of claim 18, wherein the interrogation zone is formed between a pair of EAS pedestals, each EAS pedestal positioned to rest on a floor, the infrared sensor array including a plurality of infrared sensor pairs, each infrared sensor pair including one transmitting component and one receiving component, the transmitting component located on one EAS pedestal of the pair of EAS pedestals, the receiving component located on the other EAS pedestal of the pair of EAS pedestals, such that when activated, each infrared sensor pair forms one of the plurality of breakable beams between the pedestals, each breakable beam is an infrared beam.

20. The EAS system controller of claim 19, wherein the processor is further configured to determine that at least one infrared sensor pair is blocked, the cart detection subsystem is further configured to deactivate the at least one blocked infrared sensor pair based at least in part on the determination that the at least one infrared sensor pair is blocked.

* * * * *